(12) United States Patent
Li et al.

(10) Patent No.: US 10,567,750 B2
(45) Date of Patent: Feb. 18, 2020

(54) SIGNAL SOURCE FOR ELECTROMAGNETIC INTERFERENCE TEST OF DISPLAY DEVICES

(71) Applicant: BOE TECHNOLOGY GROUP CO., LTD., Beijing (CN)

(72) Inventors: Qingyong Li, Beijing (CN); Jianfu Liu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 153 days.

(21) Appl. No.: 15/069,376

(22) Filed: Mar. 14, 2016

(65) Prior Publication Data

US 2016/0301925 A1 Oct. 13, 2016

(30) Foreign Application Priority Data

Apr. 7, 2015 (CN) .......................... 2015 1 0160920

(51) Int. Cl.
*H04N 17/04* (2006.01)
*H04N 5/213* (2006.01)
(Continued)

(52) U.S. Cl.
CPC ........... *H04N 17/004* (2013.01); *H04N 5/213* (2013.01); *H04N 5/63* (2013.01); *H04N 5/64* (2013.01)

(58) Field of Classification Search
CPC .................................................. H04N 17/004
(Continued)

(56) References Cited

U.S. PATENT DOCUMENTS 5,742,074 A * 4/1998 Takizawa .............. G02F 1/1345
257/59
2011/0232956 A1 * 9/2011 Ramsey ............... H05K 9/0069
174/382

(Continued)

FOREIGN PATENT DOCUMENTS

CN 101498752 A 8/2009
CN 201928389 U 8/2011

(Continued)

OTHER PUBLICATIONS

Chinese Office Action in Chinese Application No. 201510160920.4, dated Mar. 6, 2017 with English translation.

*Primary Examiner* — Jefferey F Harold
*Assistant Examiner* — Justin Sanders
(74) *Attorney, Agent, or Firm* — Collard & Roe, P.C.

(57) ABSTRACT

A signal source for electromagnetic interference test of display devices, comprising: a housing capable of attenuating an electromagnetic signal; a parameter receiving module located within the housing and configured to receive related parameters of a signal required for testing a display device; a signal generating module located within the housing and configured to generate a signal required for testing the display device in accordance with the parameters received by the parameter receiving module; and an output interface located on the housing and configured to output the signal generated by the signal generating module. Adopting this signal source to perform EMI test on display devices can eliminate the influence of the signal source, thus reduce the complexity of the test, and make the test become simple and efficient.

7 Claims, 1 Drawing Sheet

(51) Int. Cl.
*H04N 17/00* (2006.01)
*H04N 5/64* (2006.01)
*H04N 5/63* (2006.01)

(58) Field of Classification Search
USPC ........................................................ 348/177
See application file for complete search history.

(56) References Cited

U.S. PATENT DOCUMENTS

| | | | | |
|---|---|---|---|---|
| 2011/0242330 | A1* | 10/2011 | Petersson | H04N 17/004 |
| | | | | 348/180 |
| 2014/0187173 | A1* | 7/2014 | Partee | H04L 43/045 |
| | | | | 455/67.12 |
| 2015/0264842 | A1* | 9/2015 | Song | H05K 9/0032 |
| | | | | 361/714 |
| 2015/0381269 | A1* | 12/2015 | Deyle | H04B 7/22 |
| | | | | 455/41.2 |

FOREIGN PATENT DOCUMENTS

| | | |
|---|---|---|
| CN | 202206506 U | 4/2012 |
| CN | 203787067 U | 8/2014 |
| CN | 104125453 A | 10/2014 |
| JP | 2000-333214 A | 11/2000 |

\* cited by examiner

SIGNAL SOURCE FOR ELECTROMAGNETIC INTERFERENCE TEST OF DISPLAY DEVICES

CROSS REFERENCE TO RELATED APPLICATIONS

Applicant claims priority under 35 U.S.C. § 119 of Chinese Application No. 201510160920.4 filed on Apr. 7, 2015, the disclosure of which is incorporated by reference.

TECHNICAL FIELD

The present disclosure relates to a signal source for electromagnetic interference test of display devices.

BACKGROUND

During Electromagnetic Interference (EMI) radiation emission test of display devices, a usually adopted signal source is Personal Computer (PC). In the EMI related standard (e.g., GB 9254-2008), it is required that an EMI radiation emission level of a auxiliary equipment for the test, which is serving as a signal source, is lower than a radiation emission value required in the standard by 6 dB. EMI radiation emission levels of PCs from different manufacturers are quite different from each other.

In addition, a PC has a huge system, wherein main frequencies of all core chips such as Center Processing Unit (CPU) and Graphic Processing Unit (GPU) are above 1 GHz, and wherein all of the signal communications between CPU and memory as well as the north and south bridges belong to high-speed digital circuits. The presence of these strong interference sources causes PC to have a high level of radiation emission. In order to reduce the level of radiation emission, a metal shielding enclosure is adopted for PC to attenuate an interference signal on the propagation path. Although the metal enclosure is adopted, the level of radiation emission of the PC remains high, especially after PC is connected with a display device, because a video cable for outputting a video signal acts as a transmission antenna which radiates an interference current flowing through the cable into space.

Compared with PC, a display terminal per se serving as a device under test has a small system, whose circuit has much lower main frequency than that of PC. In many radiation emission tests of display devices, failing to pass a test is not because of the device under test per se, but because the radiation emission of PC serving as the auxiliary equipment is out of gauge. In order to pass the test, it often needs to replace multiple PCs to perform comparison tests, or to block the interference on the propagation path by improving a shielding effectiveness of the video cable. However, the aforesaid measures all lead to an increase of test cost by different levels.

To sum up, the intensity of radiation emission of the current signal source (i.e., PC) is high, by which it is apt to radiate interference into space via a cable, causing that a test result cannot reflect actual electromagnetic compatibility of the tested device. And so, during the test, it is necessary to deal with situations of failing to pass test, which is not caused by the device under test per se, and this will increase the complexity of the test.

SUMMARY

An embodiment of the present disclosure provide a signal source, for solving the following technical problem: an intensity of radiation emission of a signal source is high, by which it is apt to radiate interference into space via a cable, causing that a test result cannot reflect the actual electromagnetic compatibility of the tested device.

The signal source provided by an embodiment of the present disclosure comprises:

a housing capable of attenuating an electromagnetic signal;

a parameter receiving module located within the housing and configured to receive related parameters of a signal required for testing a display device;

a signal generating module located within the housing and configured to generate a signal required for testing the display device in accordance with the parameters received by the parameter receiving module; and an output interface located on the housing and configured to output the signal generated by the signal generating module.

The structure of the signal source provided by the embodiment of the present disclosure is simple, and thus a relatively low main frequency may be adopted to make the level of radiation emission less than the level of radiation emission of a signal source known by the inventor. Additionally, the modules in the signal source provided by the embodiment of the present disclosure are located within the housing capable of attenuating an electromagnetic signal, and connection lines among modules are therefore also within the housing capable of attenuating an electromagnetic signal. So, an electromagnetic signal will be attenuated by the housing when radiating via the connection lines, by which the level of radiation emission can be further reduced. Therefore, by adopting the signal source provided by the embodiment of the present disclosure to perform EMI test on a display device, the influence of the signal source can be eliminated, and the complexity of the test is thus reduced, which makes the test become simple and efficient.

DETAILED DESCRIPTION OF THE EMBODIMENTS

Hereinafter, a signal source provided by an embodiment of the present disclosure will be described in combination with the accompany drawings.

Figure 1:
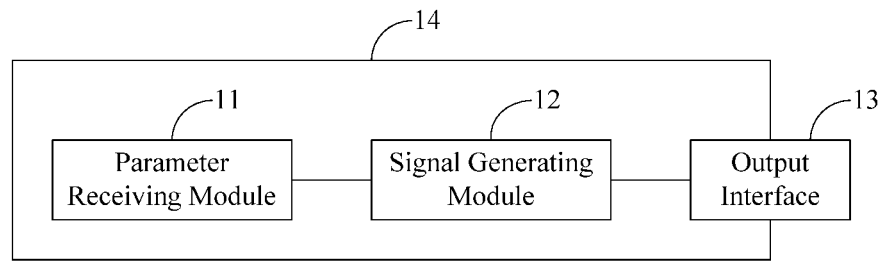
FIG. 1 is a structural schematic diagram of a signal source provided by an embodiment of the present disclosure.

FIG. 1 illustrates a signal source provided by an embodiment of the present disclosure, which comprises a parameter receiving module 11, a signal generating module 12, an output interface 13, and a housing 14 capable of attenuating an electromagnetic signal. The parameter receiving module 11 and the signal generating module 12 may be both located within the housing 14 capable of attenuating an electromagnetic signal, and the output interface 13 may be located on the housing 14 capable of attenuating an electromagnetic signal. The parameter receiving module 11 may receive related parameters of a signal required for testing a display device. The signal generating module 12 may generate a signal required for testing the display device in accordance with the parameters received by the parameter receiving module 11. The output interface 13 may output the signal generated by the signal generating module 12. The housing capable of attenuating an electromagnetic signal may be a mental housing.

In addition, in the signal source shown in FIG. 1, a window portion of the parameter receiving module 11 and being located on the housing 14 capable of attenuating an electromagnetic signal may be made of light-transmitting material that can shield the electromagnetic signal, for example, glass with metal mesh or glass coated with a metal layer, so as to preserve the integrity of the housing 14 capable of attenuating an electromagnetic signal to authenticate the interference signal radiated by the signal source to the maximum. A user may use a remote control to transmit a signal to the parameter receiving module 11, via the window portion of the parameter receiving module 11 and being located on the housing 14 capable of attenuating an electromagnetic signal.

The structure of the signal source provided by the embodiment of the present disclosure is simple, whose architecture is relatively small, and thus a relatively low main frequency may be adopted. In addition, connection lines among the modules in the signal source are also located within the housing capable of attenuating an electromagnetic signal, causing the radiation emission level lower. Therefore, by adopting the signal source provided by the embodiment of the present disclosure to perform EMI test on display devices, the influence of the signal source can be eliminated, and the complexity of the test is reduced.

Figure 2:
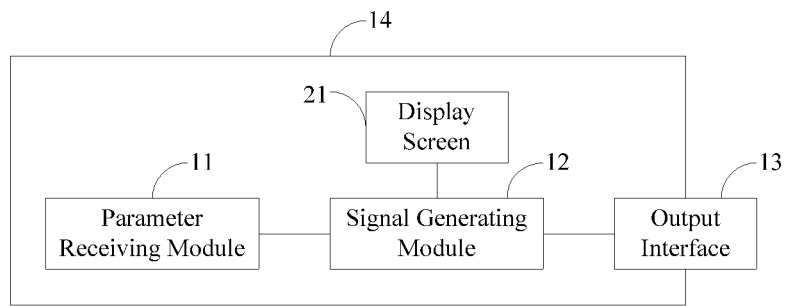
FIG. 2 is a structural schematic diagram of a signal source provided by an embodiment of the present disclosure.

FIG. 2 illustrates a signal source provided by another embodiment of the present disclosure, which further comprises a display screen 21. The display screen 21 is located within the housing 14 capable of attenuating an electromagnetic signal and can display the parameters of the signal generated by the signal generating module 12. A window portion of the display screen 21 may be located on the housing 14 capable of attenuating an electromagnetic signal, and may be made of light-transmitting material that can shield the electromagnetic signal, for example, glass with metal mesh or glass coated with a metal layer, so that the user can view the parameters of the signal outputted by the signal source via the window portion of the screen 21, and regulate the signal outputted by the signal source, thus implementing human-computer interaction. The window portion of the display screen 21 may also adopt light-transmitting material that can shield the electromagnetic signal, so as to preserve the integrity of the housing capable of attenuating an electromagnetic signal to authenticate the interference signal radiated by the signal source to the maximum.

Figure 3:
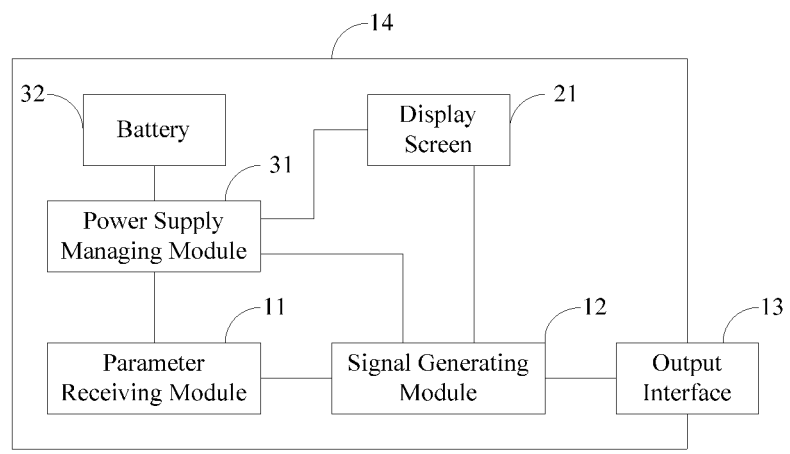
FIG. 3 is a structural schematic diagram of a signal source provided by an embodiment of the present disclosure.

FIG. 3 illustrates a signal source provided by another embodiment of the present disclosure, which further comprises a power supply managing module 31 and a battery 32. The power supply managing module 31 and the battery 32 may both be located within the housing 14 capable of attenuating an electromagnetic signal. The battery 32 supplies power to the parameter receiving module 11, the signal generating module 12, and the display screen 21 in the signal source via the power supply managing module 31. The battery 32 may be a rechargeable battery, and may be charged and discharged via the power managing module 31. When adopting the signal source shown in FIG. 3, because respective electricity-consuming modules in the signal source can be all powered by the battery via the power managing module, compared with the case where the signal source is powered by an external power supply, radiating an interference signal outwardly via a cable between the signal source and the external power supply can be avoided.

When supply voltages of respective electricity-consuming modules in the signal source are different, the battery 32 can output voltages required by respective electricity-consuming modules in the signal source via the power managing module 31.

Optionally, the parameter receiving module in the signal source provided by an embodiment of the present disclosure may be an infrared receiving module. A user can transmit an infrared frequency band signal to the parameter receiving module via a remote control.

Optionally, the signal generating module in the signal source provided by an embodiment of the present disclosure may comprise a programmable device and a peripheral circuit, wherein the programmable device may be Field-Programmable Gate Array (FPGA), or Application Specific integrated Circuit (ASIC) or Complex Programmable Logic Device (CPLD) and the like.

Optionally, the output interface in the signal source provided by an embodiment of the present disclosure may be at least one of the following interfaces: Video Graphics Array Interface (VGA), Digital Video Interface (DVI), and High Definition Multimedia Interface (HDMI). When the output interface provided by an embodiment of the present disclosure comprises VGA interface, DVI and HDMI, the signal source provided by an embodiment of the present disclosure can directly provide a detection signal for any display devices.

The signal source provided by an embodiment of the present disclosure has a simple hardware structure, a low cost, and a very low level of radiation emission of the interference signal, and is quite suitable for performing electromagnetic interference test on display devices.

It should be appreciated that the accompanying drawings are schematic diagrams of the embodiments of the present disclosure, and the modules or flows in the drawings are not necessarily mandatory for implementation of the present disclosure. It should also be appreciated that the modules of the devices provided by the embodiments of the present disclosure may be distributed in the devices of the embodiments according to the descriptions of the embodiments, and may also be changed accordingly and located within one or more devices different from those in the above embodiments. It should also be appreciated that the modules according to the embodiments described above may either be combined into one module or be further split into multiple sub-modules.

Obviously, those skilled in the art can make various modifications and variations to the present disclosure without departing from the spirit and scope thereof. The present disclosure is also intended to cover these modifications and variations.

The present application claims priority of the Chinese Patent Application No. 201510160920.4 filed on Apr. 7, 2015, the entire disclosure of which is hereby incorporated in full text by reference as part of the present application.

What is claimed is:

1. A signal source, comprising:
   a housing capable of attenuating an electromagnetic signal, the housing having a window portion which is made of glass with metal mesh or glass coated with a metal layer so as to preserve integrity of the housing to authenticate the interference signal radiated by the signal source;
   a parameter receiving module located within the housing and configured to receive related parameters of an interference signal required for testing Electromagnetic Interference radiation emission of a display device, wherein the signal parameters required for testing the display device received by the parameter receiving module pass the window portion wirelessly from outside of the signal source;

a signal generating module located within the housing and configured to generate a the interference signal required for Electromagnetic Interference radiation emission of testing the display device based on the parameters received by the parameter receiving module; and an output interface located on the housing and configured to output the signal for testing Electromagnetic Interference radiation emission of the display device generated by the signal generating module to the display module device.

2. The signal source according to claim 1, further comprising:

a display screen located within the housing and configured to display the parameters of the signal generated by the signal generating module, wherein a window portion of the display screen is located on the housing and is made of light-transmitting material that shields the electromagnetic signal.

3. The signal source according to claim 2, further comprising a power supply managing module and a battery, wherein the power supply managing module and the battery are both located within the housing, and the battery supplies power to the parameter receiving module, the signal generating module, and the display screen in the signal source via the power supply managing module.

4. The signal source according to claim 1, wherein a window portion of the parameter receiving module is located on the housing and is made of light-transmitting material that shields the electromagnetic signal.

5. The signal source according to claim 1, wherein the parameter receiving module is an infrared receiving module.

6. The signal source according to claim 1, wherein the signal generating module comprises a programmable device and a peripheral circuit.

7. The signal source according to claim 1, wherein the output interface is at least one of the following interfaces:
Video Graphics Array Interface;
Digital Video Interface; and
High Definition Multimedia Interface.

* * * * *